April 19, 1955  B. D. IRVIN  2,706,510
TRACTION DEVICE FOR WHEELED VEHICLES
Filed Oct. 30, 1952  4 Sheets-Sheet 1
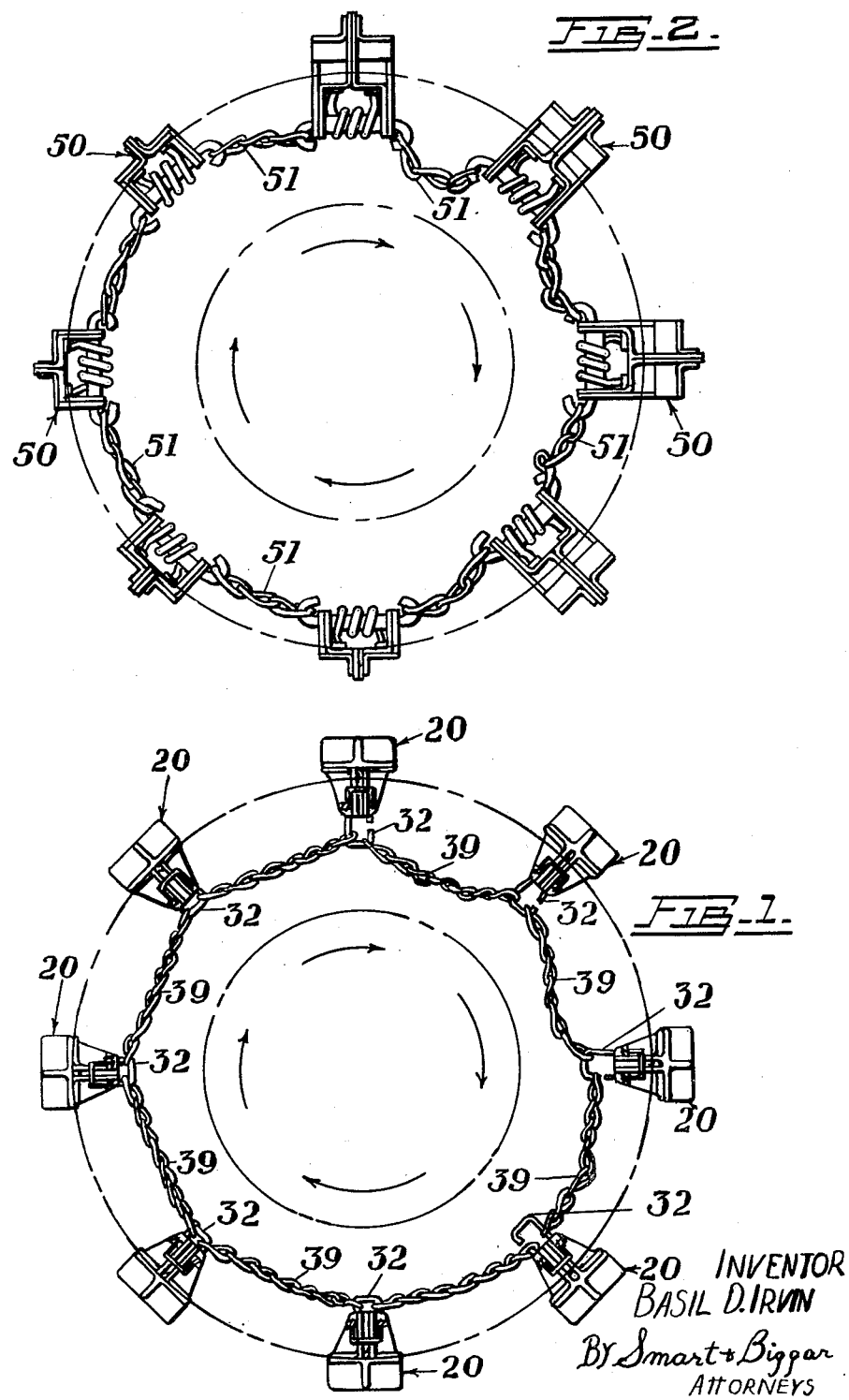

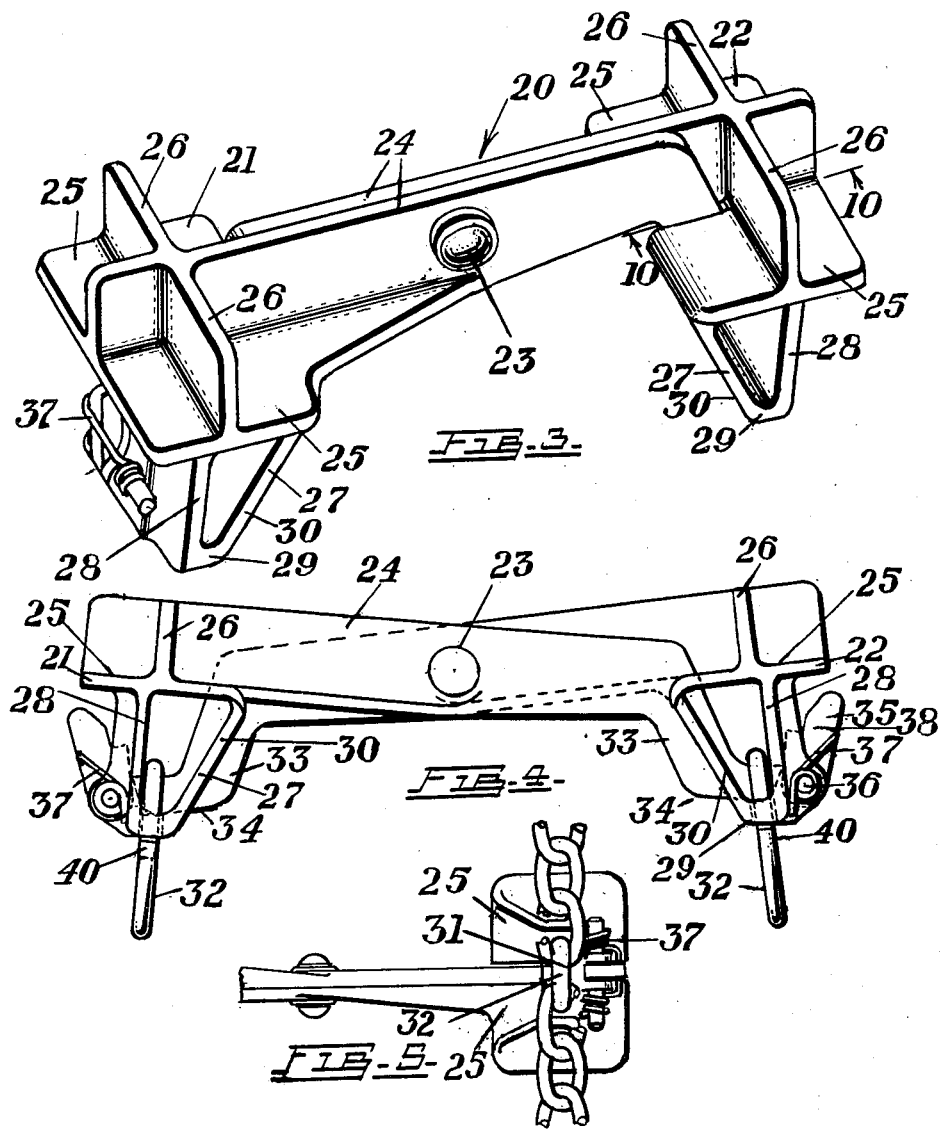

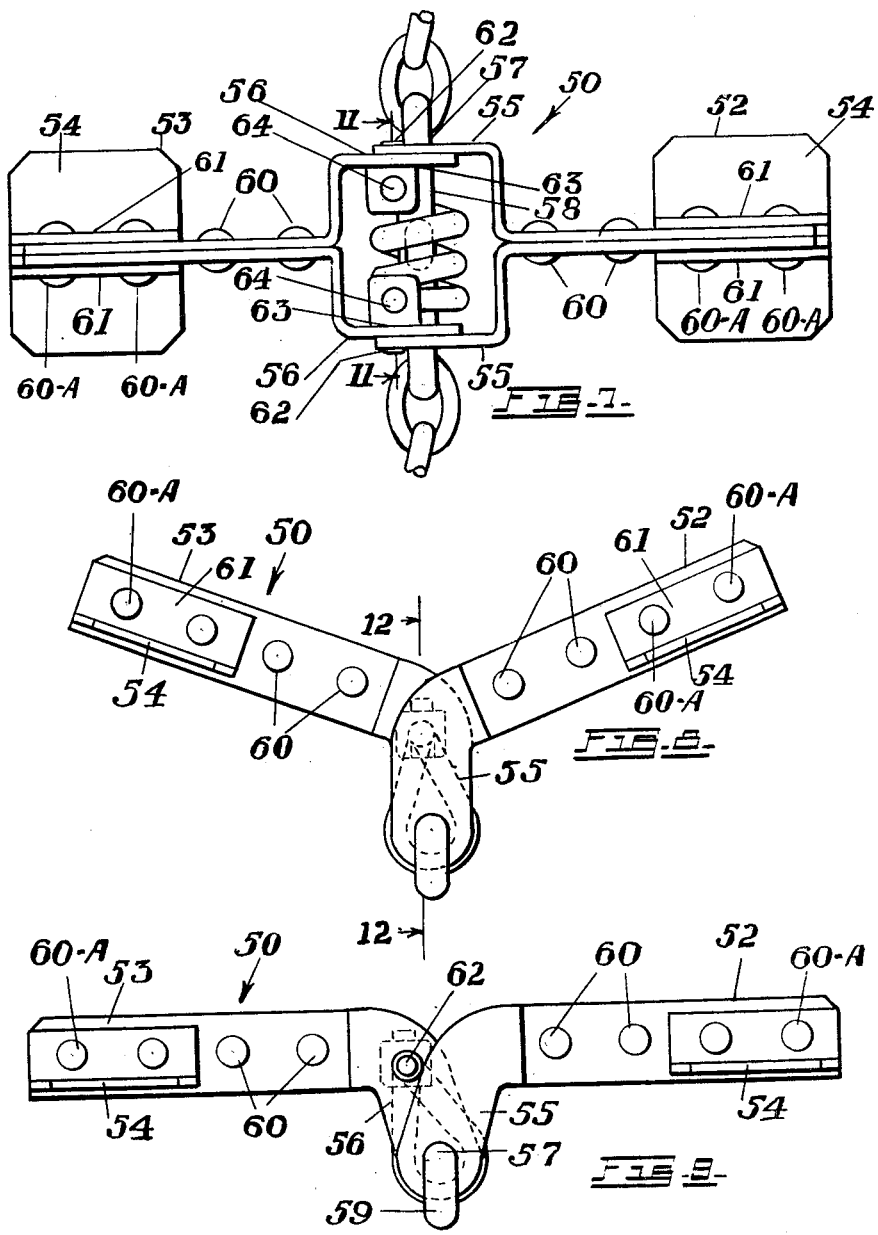

April 19, 1955   B. D. IRVIN   2,706,510
TRACTION DEVICE FOR WHEELED VEHICLES
Filed Oct. 30, 1952   4 Sheets-Sheet 4
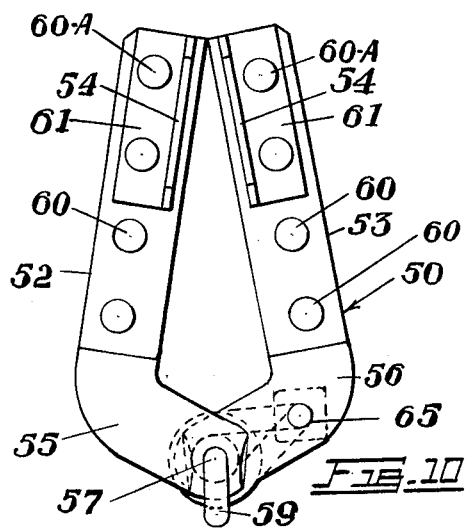
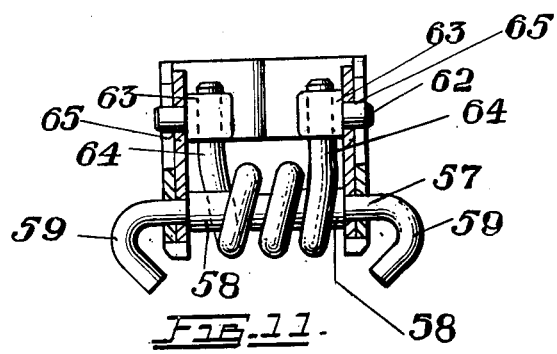
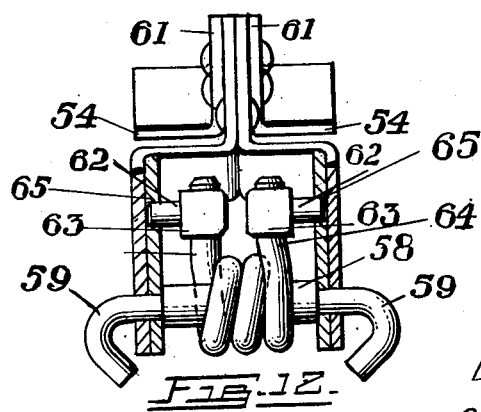
INVENTOR
BASIL D. IRVIN
BY Smart & Biggar
ATTORNEYS United States Patent Office 2,706,510
Patented Apr. 19, 1955

2,706,510

TRACTION DEVICE FOR WHEELED VEHICLES

Basil Dion Irvin, Ottawa, Ontario, Canada

Application October 30, 1952, Serial No. 317,665

Claims priority, application Canada July 16, 1952

18 Claims. (Cl. 152—220)

The invention relates to a traction device for application to the individual wheel units of wheeled vehicles whether mounting a single resilient tire or more than one such tire arranged side by side on a common axle.

It has until recent years been considered that wheeled vehicles are limited to operation on relatively firm ground and that an entirely different type of vehicle must be provided for negotiating mud and sand and other soft surfaces, namely conventional full track laying or semi track laying vehicles in which all or a portion of the weight of the vehicle is supported on bogie wheels which run freely on an endless track which is articulated in the plane of the bogie wheels and is driven by a sprocket wheel. More recently, however, various proposals have been made for extending the scope of wheeled vehicles by increasing the flotation and adhesion of their wheels. Thus, it is the practice with heavy duty vehicles to use either very large size tires on single wheels or to use a unit consisting of two tires arranged side by side, and known as a dual wheel unit, to improve flotation, and it is common to apply so called chains intended to increase the adhesion between the wheels and the ground. It is generally recognised, however, that in order to obtain satisfactory performance from a resilient tired driving wheel in soft, slippery and otherwise unfavourable conditions of terrain, it is necessary to mount on the tread of the tire a series of rigid radially spaced grouser bars lying transversely across the line of travel and having the greatest depth that may be tolerated. It is further desirable, especially in very soft ground, to provide in a plane at right angles to the grousers and extending beyond the width of the tire, additional flotation plates which can serve appreciably to increase the area of wheel element in contact with the ground. By such means only can the "traction" and "flotation" characteristics of a wheel be appreciably improved.

The principal difficulty with the proposals heretofore made is that it has been found impossible under heavy traction conditions, to stop the wheel from rotating within the traction device with consequent loss of traction and chafing of the tire, without either attaching the device rigidly to the wheel itself or else tightening it on the tire until full interference is obtained between each shoe and the tire profile. The former arrangement necessitates modification or additions to the wheel structure, which is undesirable, while the latter has proven to be a matter of great mechanical difficulty.

It will be obvious that any device which will appreciably improve the traction and flotation characteristics of a wheel in soft ground will inevitably be of a size and shape which will render its employment on hard, smooth terrain most undesirable. An important object of the invention is therefore to provide a traction device of the kind described which it is possible without difficulty to install tightly on the individual wheel units providing full interference between each shoe and the tire profile. The term "individual wheel units" as used herein includes both the so-called "dual wheels" and "single wheels" which are herein referred to respectively as dual-tired wheels and single-tired wheels and is used to distinguish the device from "girdles" or wrap around tracks designed to extend over two individual wheels (dual-tired or single-tired) arranged in line, one behind the other.

A more specific object of the invention is to provide a device of the kind described which is mounted loosely on the wheel unit and is automatically tightened to the desired extent as the wheel unit rolls, and is held in the tightened condition.

A further object of the invention is to provide such a device which is held in the tightened condition by readily releasable latch means.

Further specific features of the invention appear from the attached claims and the following description with reference to the drawings in which:

Figure 1 is a side elevation of a traction device according to the invention applied to a single-tired vehicle wheel, Figure 2 is a side elevation of a traction device according to the invention applied to a dual-tired wheel, the near tire being removed, Figure 3 is a perspective view of a single shoe of the embodiment of the device illustrated in Figure 1 with the articulated sections in the latched condition substantially parallel to each other, Figure 4 is an elevation of the shoe of Figure 3 with the sections of the shoe in the unlatched condition in which they are installed on a wheel, Figure 5 is a plan view of one end of the shoe according to Figures 3 and 4 illustrating the hollow boss arrangement, Figure 6 is a detail on an enlarged scale illustrating the latching arrangement according to Figures 1 and 3 to 5, Figure 7 is a plan view of the track shoe of the embodiment of the invention illustrated in Figure 2, Figure 8 is an elevation of the shoe according to Figure 7 with the shoe sections in the unlatched condition as in Figure 4, Figure 9 is an elevation of the shoe according to Figures 7 and 8 with the shoe sections in the latched condition substantially parallel to each other, Figure 10 is an elevation of the shoe according to Figures 7 to 9 in the stowed position, Figure 11 is a section on the line 11—11 of Figure 7 illustrating the latching arrangement, and Figure 12 is a section on the line 12—12 of Figure 8 further illustrating the latching arrangement.

Referring first to Figures 3 to 5, each shoe 20 is formed of two identical sections 21 and 22 pivotally connected by means of a pin or the like 23. Each section comprises a long and narrow grouser bar 24 adapted to extend across the profile of the tire, and a flotation plate 25 at the level of that face of the section 21 or 22 which engages the tire. The grouser bar 24 is provided with wings 26 in the area of the flotation plate 25 and the opposite face of the flotation plate 25 is provided with an integral hollow boss 27 having a wall 28 extending substantially at right angles from the plate 25, a base 29 extending substantially parallel to the plate 25 and a wall 30 extending at an angle from the base 29 to the plate 25 at a point near the inner side thereof. The base 29 is provided as illustrated in Figure 5 with a hole 31 adapted to pass an elongated chain link 32 and each of the walls 28 and 30 is slotted to receive the end of the cooperating shoe section opposite its flotation plate. That is, the hollow boss walls 28 and 30 of section 21 are slotted to receive the end opposite the flotation plate of the section 22, and vice versa. Such end, opposite the flotation plate, is formed with an offset portion 33 and a latch-engaging portion 34 substantially parallel to the grouser bar 24 and adapted to extend through the chain link 32 after the same has been inserted through the hole 31.

As will be understood on referring to Figure 4, the action of the end portion 34, when the weight of the vehicle brings the sections 21 and 22 parallel to each other (as illustrated in Figure 3), and thus moves the portions 34 away from the wheel axis, is to force the link 32 further into the hollow boss 27. Thus the end portion 34 of the section 21 acts on the link 32 cooperating with the hollow boss of the section 22, and the end portion 34 of the shoe section 22 acts on the link 32 cooperating with the hollow boss of the shoe section 21. A latch member 35 pivotally mounted on a pin 36 journalled in each boss 27 to swing in the same plane as end portion 34 is urged inwardly of each hollow boss by a spring member 37. Each latch member 35 is provided with a notch 38 in which the end portion 34 engages, as illustrated in Figure 6, when the shoe sections are forced by the weight of the vehicle into the parallel position indicated in Figure 3.

Referring now to Figure 1, it will be seen that the individual shoes are interconnected by short lengths of chain 39 connected at each end to a link 32. The device is easily mounted on a wheel because of the slack permitted in the chain 39 between the individual shoes. As appears from Figures 1, 4 and 6, each of the links 32 is cut away on one side to form a gap 40 through which a link of the chain 39 may be passed, this gap being positioned so that it is accessible when the sections of the shoe are set at an angle as in Figure 4 but is within the hollow boss 27 when the shoe is in the latched position of Figure 3. When the device has thus been mounted relatively loosely on the wheel, the vehicle is moved forward or backward so as to rotate the wheel with the weight of the vehicle on it. As the vehicle load comes on each shoe and forces the two sections 21 and 22 into parallelism, the grouser bars being then as indicated in Figure 3, the links 32 of that shoe are drawn into the respective hollow bosses and as the wheel continues to roll this procedure is automatically repeated with each of the shoes thereby moving the links 32 and thus the lengths of chain 39 away from the axis of the wheel and this tensioning them and drawing the shoes radially inwardly so as to grip the tire firmly. By virtue of the latch arrangement described, this tension is maintained and thus the device is automatically tightened on the tire as the wheel rotates. In Figure 1 the direction in which the wheel is travelling is indicated by the arrow. One shoe on which the wheel is resting has just been moved into the parallel position and latched as have the three preceding shoes while four other shoes have yet to be forced into the parallel position and latched as the wheel rotates in the direction indicated.

To remove the device from the wheel, the latch members 35 are forced clear of the portions 34 by suitable means, whereupon the tension on the lengths of chain 39 pulls the portions 34 and links 32 toward the wheel axis and the shoes as they are unlatched assume the position illustrated in Figure 4.

Referring now to Figures 2 and 7 to 12, the embodiment of the device according to the invention for use with a dual-tired wheel comprises shoes 50 having the point of connection to a length of chain 51 (which is thus moved toward and away from the wheel axis) between the two tires of the unit. Each shoe consists of a section 52 and a section 53 each provided at the outer end with a flotation plate 54 and each being bifurcated at the inner end as best illustrated in Figure 7 with the legs 55 of the section 52 spaced farther apart than the legs 56 of the section 53 a distance just sufficient for the legs 55 to straddle the legs 56. A pin 57 then extends through aligned holes formed in the legs 55 and 56 to form a pivot for the sections 52 and 53. As appears from Figures 11 and 12, each pin 57 is provided with a sleeve 58 serving to space the legs 56 and thus the legs 55 and each pin is bent into the form of a hook 59 outwardly of the legs 55 for connection to a link of the length of chain 51 extending to the adjacent shoe.

In the embodiment of the invention illustrated in Figures 7 to 12, each of the sections 52 and 53 is formed in two halves secured together by rivets 60, and the flotation plate 54 is made up of two sections each secured to a shoe section 52 or 53, by means of a flange 61 riveted to a shoe section by rivets 60A.

As is the case with the single tire embodiment of the device as described above, the two sections of the shoe are forced by the weight of the vehicle on engagement by the two tires into a position in which they are substantially parallel as illustrated in Figure 9, and are latched in that position so that they cannot return to the position illustrated in Figure 8 in which the sections extend at an angle to each other and the pins 57 are positioned closer to the wheel axis than when the sections are in the position shown in Figure 9.

One form of latching device for the dual tire form of shoe is illustrated in Figures 7 to 12 and consists essentially of pins 62 each formed with a shoulder 63 engaged by an end of a spring 64 coiled about the pin 57 and sleeve 58 in such manner as to urge the pins 62 outwardly. The legs 56 are provided with holes 65 adapted to pass the pins 62 and these are of a length to project beyond the legs 56 into the path of the legs 55, when the shoe sections are in the substantially parallel position illustrated in Figure 9 or the stowed position as illustrated in Figure 10. The holes 65 are positioned so that when the sections are in the position illustrated in Figure 8 (in which they are set during the application of the device to a vehicle wheel) the pins 62 being retracted by a suitable tool, the holes 65 are obstructed by the legs 55 and, the ends of the pins bear on the inner face of the respective leg 55. As the weight of the vehicle moves the sections into the substantially parallel position illustrated in Figure 9, the ends of the pins 62 slide in an arcuate path radiused from the pivot pin 57 over the inner face of the respective leg 55 until the same moves clear of the hole 65, and then the pins 62 project outwardly of the legs 56 into the path which the legs 55 must follow if moved back into the position illustrated in Figure 8.

As in the case of the single tired form of shoe the device is mounted loosely on the dual tired wheel (see Figure 2) and the wheel is rolled successively over the individual shoes thus forcing away from the wheel axis each of the pins 57 thus tightening the length of chain 51. As the shoes move from the position shown in Figure 8 to that shown in Figure 9, the pins 62 clear the legs 55 and are forced by the spring 64 to project so as to prevent return of the sections 52 and 53 to the position shown in Figure 8. Referring to Figure 2, the direction of rotation is indicated by the arrow, and four shoes have been latched, whereas the wheel has yet to roll onto the remaining shoes (four in the embodiment illustrated).

A considerable advantage of the dual tire form of shoe which is illustrated is that it folds into a stowing position occupying little space as illustrated in Figure 10. The sections are folded into this position by moving the two sections as viewed in Figure 9 downwardly and inwardly.

What I claim is:

1. A traction device for application to the individual wheel units of resilient tired vehicles, comprising a plurality of articulated track shoes, flexible inexpansible means for interconnecting said track shoes, connector means for connection of each shoe to said interconnecting means, each shoe comprising at least two sections and means pivotally connecting the same for pivoting under the influence of said interconnecting means in a direction to move said connector means toward the wheel axis, and pivoting in the opposite direction on application of the wheel load to move said connector means away from the wheel axis, and latch means automatically engaging on setting of the shoe sections in a desired position on movement in said second direction to prevent the return of said connector means toward the wheel axis.

2. A traction device for application to the individual single-tired wheel units of resilient tired vehicles, comprising a plurality of articulated track shoes, flexible inexpansible means for interconnecting the track shoes, connector means adjacent each end of each shoe for connection of each shoe to said interconnecting means, each shoe comprising two sections and means pivotally connecting the same intermediate their ends for pivoting under the influence of said interconnecting means in a direction to move said connector means toward the wheel axis, and pivoting in the opposite direction on application of the wheel load to move said connector means away from the wheel axis, and latch means automatically engaging on setting of the shoe sections in a desired position on movement in said second direction to prevent the return of said connector means toward the wheel axis.

3. A traction device as claimed in claim 2 in which said connector means is mounted at one end of each section, and the adjacent end of the other section is positioned to engage said connector means to move the same away from the wheel axis on pivoting of said section in said second direction.

4. A traction device as claimed in claim 3 in which the shoe section end on which said connector means is mounted comprises a hollow boss, said connector means is movable into and out of said boss on said radial movement, and said boss is formed with a slot therein adapted to pass the adjacent end of the other section.

5. A traction device as claimed in claim 4 comprising a latch member pivotally mounted on said hollow boss, and spring means urging said latch member into engagement with the adjacent end of the other section to prevent movement of said end radially inwardly of the wheel after setting of the shoe sections in said desired position under the wheel load.

6. A traction device as claimed in claim 4 comprising flotation plate means in connection with each hollow boss.

7. A traction device as claimed in claim 4 in which said connector means comprises a link, and the adjacent end of the other shoe section is adapted to project through the link within the hollow boss.

8. A traction device as claimed in claim 7 comprising flotation plate means in connection with each hollow boss.

9. A traction device as claimed in claim 7 in which at least one of the said links at each side of the device is cut away to form a gap in one side wall to pass said interconnecting means, the gap being positioned to be within the hollow boss when the shoe sections have been set in said desired position under the wheel load, and to be outside said hollow boss when said link has been moved from said position radially toward the wheel axis.

10. A traction device as claimed in claim 7 comprising a latch member pivotally mounted on said hollow boss, and spring means urging said latch member into engagement with the adjacent end of the other section to prevent movement of said end and the link engaged thereby radially inwardly of the wheel after setting of the shoe sections in said desired position under the wheel load.

11. A traction device as claimed in claim 10 in which at least one of said links at each side of the device is cut away to form a gap in one side wall to pass said interconnecting means, the gap being positioned to be within the hollow boss when the shoe sections have been set in said desired position under the wheel load, and to be outside said hollow boss when said link has been moved from said position radially toward the wheel axis.

12. A traction device for application to the individual dual tired-wheel units of resilient tired wheels, comprising a plurality of articulated track shoes, flexible inexpansible means for interconnecting the track shoes, connector means positioned substantially at the point of articulation of the shoe sections for connection of each shoe to said interconnecting means, each shoe comprising two sections and means pivotally connecting the same adjacent one end of each section between the dual tires of said unit for pivoting of the sections under the influence of said interconnecting means in a direction to move said connector means toward the wheel axis, and pivoting in the opposite direction on application of the wheel load to move said connector means away from the wheel axis, and latch means automatically engaging on setting of the shoe sections in a desired position on movement in said second direction to prevent the return of said connector means toward the wheel axis.

13. A traction device as claimed in claim 12 in which each shoe section is bifurcated at one end, and said means pivotally connecting the sections comprises a pivot pin extending through the two spaced legs of both sections.

14. A traction device as claimed in claim 13 in which the two legs of one section are straddled by the two legs of the other section and each shoe comprises a sleeve surrounding the pivot pin and spacing the inner two legs.

15. A traction device as claimed in claim 14 in which said connector means comprises a hook-like member on each end of said pivot pin adapted to engage said interconnecting means.

16. A traction device as claimed in claim 14 in which said latch means comprises at least one latch pin journalled in each of the legs of one section at a point covered by the adjacent leg of the other section when the shoe sections are set at an angle to each other under the influence of said interconnecting means but uncovered when the shoe sections have been moved to said desired position on movement in said second direction, and spring means adapted to press said latch pins into the paths of the legs of the other section.

17. A traction device as claimed in claim 16 in which said latch pins are journalled in the inner legs.

18. A traction device as claimed in claim 17 comprising a boss at the inner end of each latch pin, and a coil spring coiled about said spacing sleeves with each end engaging one of said bosses.

References Cited in the file of this patent

UNITED STATES PATENTS

| | | |
|---|---|---|
| 2,445,947 | Hoppes | July 27, 1948 |
| 2,467,654 | Boje | Apr. 19, 1949 |
| 2,518,170 | Otis | Aug. 8, 1950 |